United States Patent
Nakayama

(10) Patent No.: US 11,331,815 B2
(45) Date of Patent: May 17, 2022

(54) ROTARY SHAFT STRUCTURE AND ROBOT

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 86 days.

(21) Appl. No.: 16/879,975

(22) Filed: May 21, 2020

(65) Prior Publication Data

US 2020/0406479 A1 Dec. 31, 2020

(30) Foreign Application Priority Data

Jun. 27, 2019 (JP) .............................. JP2019-119762

(51) Int. Cl.
| | |
|---|---|
| *B25J 17/00* | (2006.01) |
| *B25J 17/02* | (2006.01) |
| *B25J 18/00* | (2006.01) |
| *B25J 19/02* | (2006.01) |
| *B25J 19/00* | (2006.01) |

(52) U.S. Cl.
CPC ............ *B25J 17/00* (2013.01); *B25J 19/0029* (2013.01); *B25J 19/02* (2013.01)

(58) Field of Classification Search
CPC ...... B25J 13/085; B25J 17/00; B25J 19/0025; B25J 19/0029; B25J 19/02
See application file for complete search history.

(56) References Cited

U.S. PATENT DOCUMENTS

| | | | | |
|---|---|---|---|---|
| 10,209,152 | B2* | 2/2019 | Matsuzawa | ............ B25J 9/1633 |
| 2016/0263749 | A1* | 9/2016 | Ogata | .................. B25J 17/0208 |
| 2019/0009417 | A1 | 1/2019 | Ogata | |
| 2020/0108514 | A1* | 4/2020 | Wang | ....................... B25J 9/126 |

FOREIGN PATENT DOCUMENTS

| | | |
|---|---|---|
| JP | H07-001380 A | 1/1995 |
| JP | 2015-123570 A | 7/2015 |
| JP | 2017-124465 A | 7/2017 |
| JP | 2018-015836 A | 2/2018 |

* cited by examiner

*Primary Examiner* — Jake Cook
(74) *Attorney, Agent, or Firm* — Maier & Maier, PLLC

(57) ABSTRACT

A rotary shaft structure including: a first member; a second member that is supported so as to be rotatable about a rotation axis with respect to the first member; an actuator that includes an output shaft member connected to the second member and that rotationally drives the second member about the rotation axis with respect to the first member; a sensor that detects a physical quantity acting between the output shaft member and the second member; and a first fixing member that is fixed to the output shaft member. A wire body is routed from the first member side to the second member side; the first fixing member extends toward the second member, with a prescribed gap between the first fixing member and the sensor; and the wire body routed from the first member side is fixed to the first fixing member on the second member side.

10 Claims, 4 Drawing Sheets

ROTARY SHAFT STRUCTURE AND ROBOT

CROSS-REFERENCE TO RELATED APPLICATIONS

This application is based on Japanese Patent Application No. 2019-119762, the contents of which are incorporated herein by reference.

FIELD

The present disclosure relates to a rotary shaft structure and a robot.

BACKGROUND

There is a known drive mechanism that supports two links so as to be rotatable about a prescribed rotation axis and that also includes a torque sensor that detects a torque acting between the links (for example, see Japanese Unexamined Patent Application, Publication No. 2017-124465).

In this drive mechanism, a wiring member is supported by an output member that is disposed at a position sandwiched between an output shaft of a reduction gear, an input shaft of which is fixed to one of the links, and the other link, and that is fixed to both the output shaft and the other link.

SUMMARY

An aspect of the present disclosure is a rotary shaft structure comprising: a first member; a second member that is supported so as to be rotatable about a rotation axis with respect to the first member; an actuator that includes an output shaft member connected to the second member, and that rotationally drives the second member about the rotation axis with respect to the first member; a sensor that detects a physical quantity acting between the output shaft member and the second member; and a first fixing member that is fixed to the output shaft member. A wire body is routed from the first member side to the second member side; the first fixing member extends toward the second member, with a prescribed gap between the first fixing member and the sensor; and the wire body routed from the first member side is fixed to the first fixing member on the second member side.

DETAILED DESCRIPTION

Figure 1:
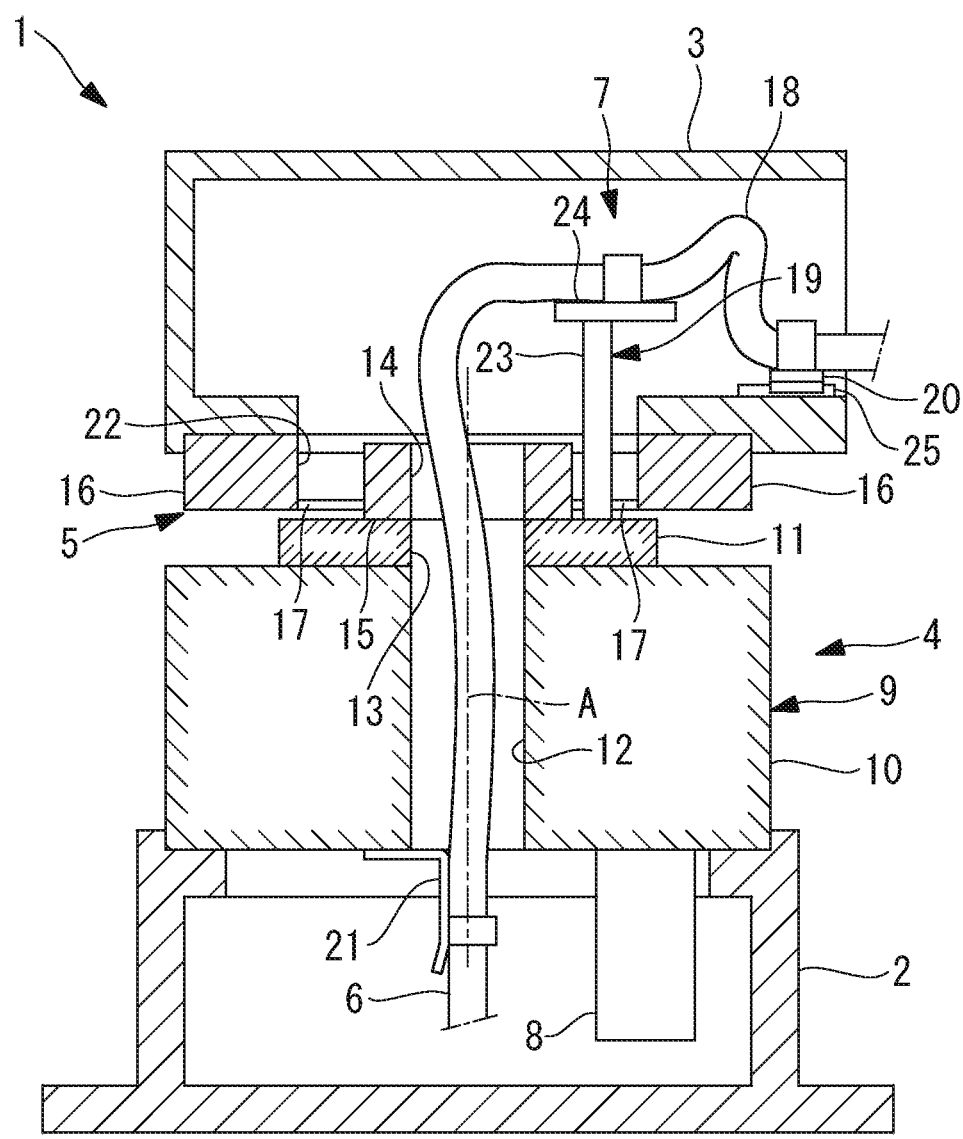
FIG. 1 is a longitudinal sectional view partially showing a robot including a rotary shaft structure according to an embodiment of the present disclosure.

A rotary shaft structure 1 and a robot according to an embodiment of the present disclosure will be described below with reference to the drawings. The robot according to this embodiment is, for example, a six-axis articulated robot having six rotary shafts. As shown in FIG. 1, at least one of the rotary shafts of this robot has the rotary shaft structure 1 according to this embodiment.

In other words, the rotary shaft structure 1 according to this embodiment includes: a first member 2; a second member 3; an actuator 4 that rotationally drives the second member 3 about a rotation axis A with respect to the first member 2; a torque sensor (sensor) 5; and a fixing member 7 that fixes a wire body 6 routed from the first member 2 side to the second member 3 side. In an example shown in FIG. 1, the first member 2 is, for example, a base that is fixed on the floor. The second member 3 is, for example, a revolving drum that is rotationally driven about the vertical rotation axis A with respect to the base.

The actuator 4 includes a motor 8 and a reduction gear 9 that decelerates the rotation of the motor 8. The reduction gear 9 includes an input shaft member 10 that is fixed to the first member 2 and an output shaft member 11 that is rotationally driven with respect to the input shaft member 10. The input shaft member 10 and the output shaft member 11 respectively have central holes 12, 13 that penetrate in the vicinity of the rotation axis A along the rotation axis A, and through which the wire body 6 can be made to penetrate.

Figure 3:
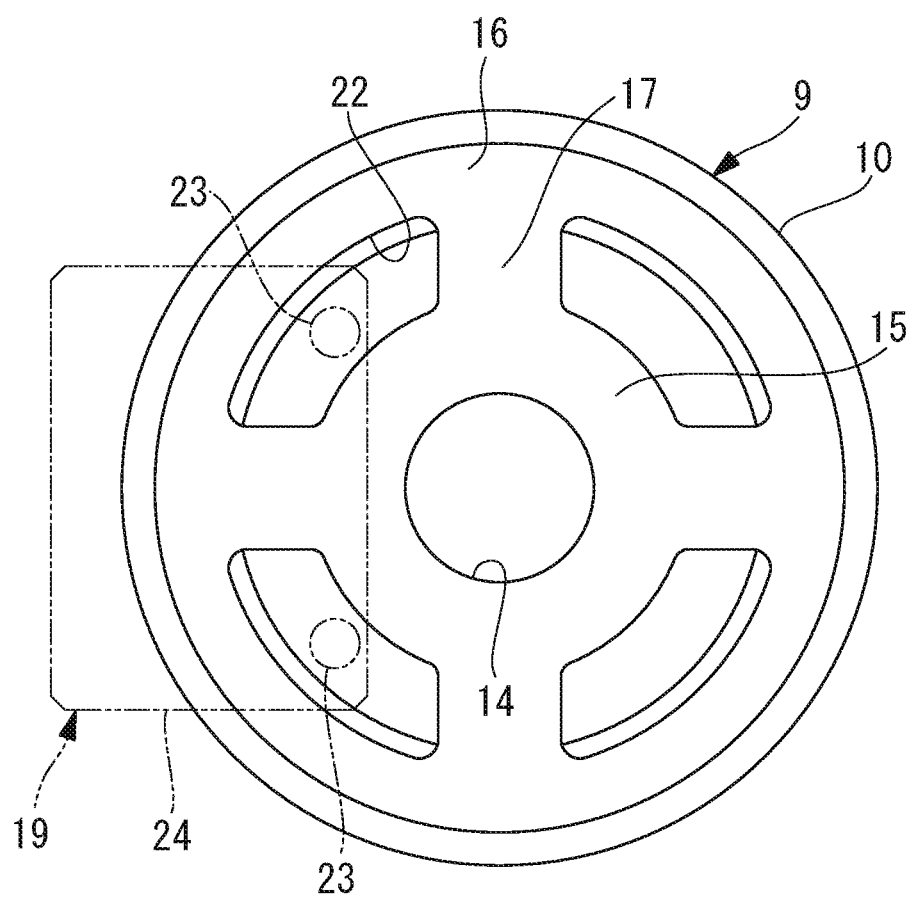
FIG. 3 is a plan view of the actuator and the torque sensor in FIG. 2, as viewed from a second member side.

As shown in FIG. 3, the torque sensor 5 includes: a first sensor constituent member 15 that is a ring-shaped input portion having a central hole 14 at the center thereof; a second sensor constituent member 16 that is a ring-shaped output portion disposed concentrically, with a space on the radial outer side of the first sensor constituent member 15; and strain-generating bodies (connecting portions) 17 that connect the first sensor constituent member 15 and the second sensor constituent member 16. The plurality of strain-generating bodies 17 are arranged at intervals in the circumferential direction. One or more strain gauges (not shown) are fixed to the strain-generating bodies 17.

The torque sensor 5 is formed in a disk shape as a whole. A through-hole 22 penetrating in the plate thickness direction is provided between two strain-generating bodies 17 adjacent in the circumferential direction. The first sensor constituent member 15 is fixed to the output shaft member 11 of the reduction gear 9 by means of a plurality of bolts or the like (not shown) that are arranged at intervals in the circumferential direction. By doing so, the output shaft member 11 is indirectly connected to the second member 3 via the torque sensor 5. The second sensor constituent member 16 is fixed to the second member 3 by means of a plurality of bolts or the like (not shown) that are arranged at intervals in the circumferential direction. As shown in FIG. 1, the central hole 14 provided in the first sensor constituent member 15 is set to have a position and a size that substantially correspond to those of the central holes 12, 13 of the reduction gear 9, when the first sensor constituent member 15 is fixed to the output shaft member 11.

Figure 2:
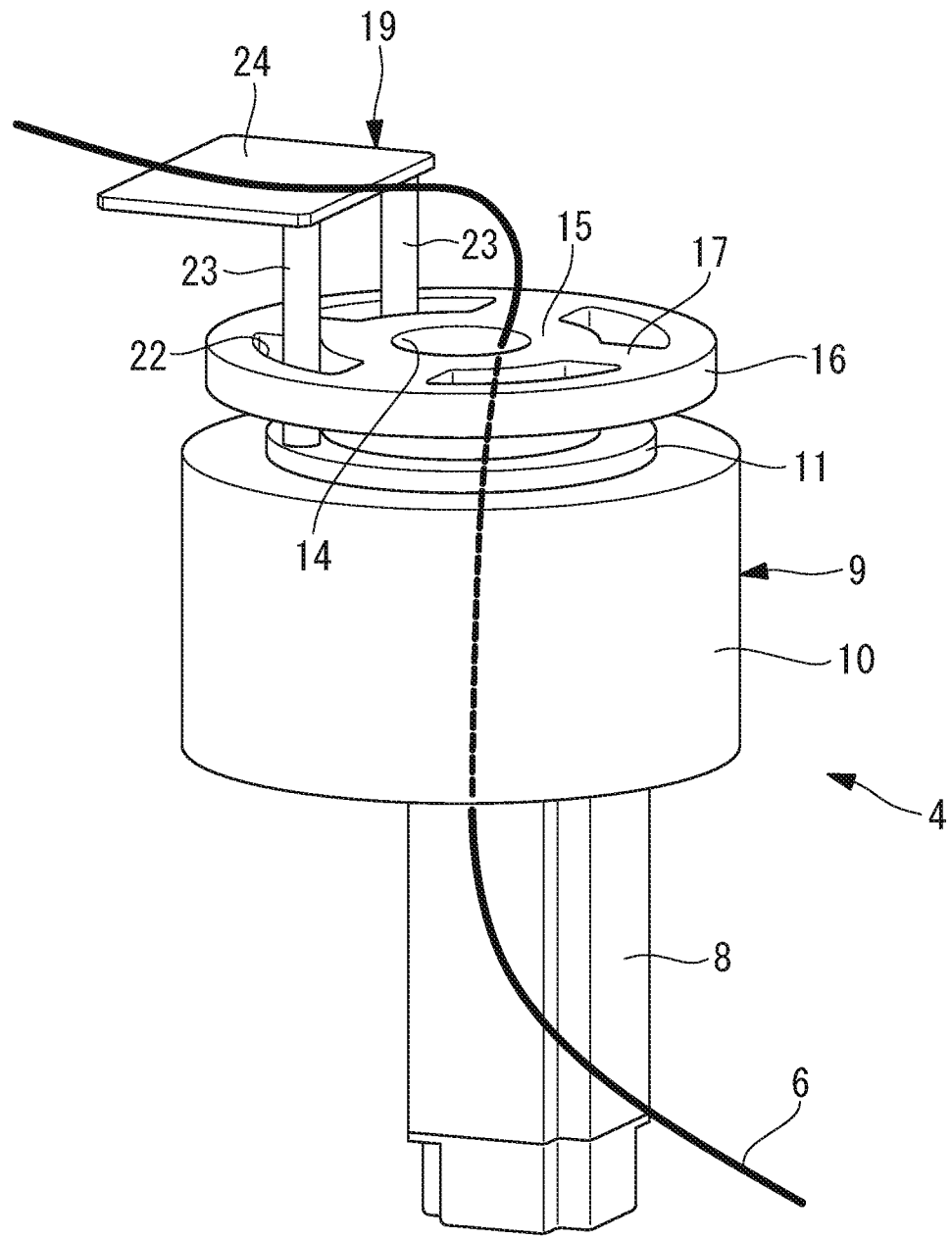
FIG. 2 is a perspective view showing an actuator and a torque sensor that are provided in the rotary shaft structure in FIG. 1.

The fixing member 7 includes: a first fixing member 19 that is directly fixed to the output shaft member 11 of the reduction gear 9; a second fixing member 20 that is fixed to the second member 3; and a third fixing member 21 that is fixed to the input shaft member 10 of the reduction gear 9. As shown in FIG. 2, the first fixing member 19 includes two shaft members 23 that penetrate through the through-holes 22 provided in the second sensor constituent member 16 of the torque sensor 5 so as to be parallel to the rotation axis A, and that extend toward the second member 3 on the opposite side of the reduction gear 9 with the torque sensor 5 interposed therebetween. The first fixing member 19 includes a flat plate-like connecting member 24 that connects the distal ends of the two shaft members 23 to each other.

As shown in FIG. 3, the shaft members 23 each have an outer diameter that is sufficiently smaller than the size of the through-hole 22 provided in the second sensor constituent member 16 of the torque sensor 5, and are each disposed between inner surfaces of the through-hole 22, with a prescribed gap between the shaft members 23. The wire body 6 can be fixed to the connecting member 24, the second fixing member 20, and the third fixing member 21 by means of fixtures such as tie wraps.

The wire body 6 penetrates, from the first member 2 side to the second member 3 side, through the central holes 12, 13, 14 provided in the actuator 4 and the first sensor constituent member 15 of the torque sensor 5. The wire body 6 is fixed to the input shaft member 10 of the reduction gear 9 by means of the third fixing member 21 at a position closer to the first member 2 than the central holes 12, 13, 14 are, and is fixed to the connecting member 24 of the first fixing member 19 and the second fixing member 20 at positions closer to the second member 3 than the central holes 12, 13, 14 are.

The wire body 6 may include, in addition to a mechanical-portion cable for driving the motor 8 of each of the rotary shafts of the robot, a sensor cable, a cable for driving a tool attached to an arm or a wrist, a tube for supplying a fluid, or the like.

The operation of the thus-configured rotary shaft structure 1 and robot according to this embodiment will be described below. With the rotary shaft structure 1 according to this embodiment, when the motor 8 is driven, the rotation of the motor 8 is decelerated by the reduction gear 9, and the output shaft member 11 is rotationally driven about the rotation axis A with respect to the input shaft member 10.

The output shaft member 11 is indirectly fixed to the second member 3 with the torque sensor 5 interposed therebetween. Because of this, when the output shaft member 11 is rotationally driven, the torque of the output shaft member 11 is transmitted to the second member 3 via the torque sensor 5, and the second member 3 is rotationally driven with respect to the first member 2. In this case, when the torque about the rotation axis A acts on the output shaft member 11, the strain-generating bodies 17 are elastically deformed and the strain gauges are strained, whereby a torque (a physical quantity) corresponding to the strain amount is detected.

By storing the torque detected by the torque sensor 5 during the normal operation and subtracting the stored torque from the actually detected torque, it is possible to detect the torque acting on the second member 3 due to, for example, contact with an external structure or a worker.

With this embodiment, the wire body 6 passing through the rotary shaft penetrates through the central holes 12, 13, 14 provided in the reduction gear 9 and the torque sensor 5. In addition, the wire body 6 is fixed to the third fixing member 21 that is disposed closer to the first member 2 than the central holes 12, 13, 14 are and to the first fixing member 19 that is disposed closer to the second member 3 than the central holes 12, 13, 14 are, with a long span between the third fixing member 21 and the first fixing member 19. By doing so, the wire body 6 is twisted in a long span even when the second member 3 is rotationally driven with respect to the first member 2, and thus, it is possible to significantly improve the lifetime for repetitive torsional motions of the wire body 6.

In this case, because the wire body 6 is elastically deformed by being twisted when the second member 3 is rotationally driven with respect to the first member 2, the reaction force thereof is received by the connecting member 24 and the first fixing member 19. The first fixing member 19 is directly fixed to the output shaft member 11 of the reduction gear 9, not to the second member 3, and is also disposed at a position not in contact with the torque sensor 5 by being made to penetrate through the through-holes 22 of the second sensor constituent member 16.

By doing so, an external force that tends to cause rotation is applied from the outside only to the reduction gear 9, and only the external force acting on the second member 3 is applied to the torque sensor 5. As a result, there is an advantage in that the rotational-direction torque that tends to restore the original state, said torque being generated by the reaction force of the wire body 6 acting on the first fixing member 19, is prevented from being directly applied to the torque sensor 5, and it is possible to detect the torque in a precise manner. In the case in which a reduction gear that has a low reverse efficiency and that requires a large force for rotation from the outside is employed as the reduction gear 9, it is possible to reduce the influence of the reaction force of the wire body 6 on a drive motor.

In other words, with the rotary shaft structure 1 and the robot according to this embodiment, it is possible to apply the invention, for example, to a collaborative robot or the like, and to precisely detect only the contact force generated as a result of a worker or the like coming into contact with the second member 3. In so-called lead through teach, in which a worker applies an external force directly to a robot and performs teaching by operating the robot in the direction of the external force, it is possible to precisely detect the applied external force and to improve the operability.

With the rotary shaft structure 1 according to this embodiment, the wire body 6 routed from the first member 2 to the second member 3 is extended in a direction in which the wire body 6 penetrates through the central holes 12, 13, 14 penetrating in a direction along the rotation axis A, not extended along a plane orthogonal to the rotation axis A. As a result, the first sensor constituent member 15 of the torque sensor 5 and the output shaft member 11 of the reduction gear 9 can be reliably fixed to each other by means of bolts or the like at a plurality of locations over the entire circumference. Therefore, as compared with the rotary shaft structure in the prior art, wherein the output shaft member 11 and the first sensor constituent member 15 of the torque sensor 5 are fixed to each other at only one location in the circumferential direction for management of the wire body 6, there is an advantage in that it is possible to significantly improve the rigidity of the rotary shaft structure.

In this embodiment, the torque sensor 5 includes the plurality of through-holes 22 penetrating in the plate thickness direction, and the first fixing member 19 has the configuration in which the end portions of the plurality of shaft members 23 penetrating through the through-holes 22 are connected by the connecting member 24. With this configuration, there is an advantage in that the wire body 6 can be supported by the high-rigidity first fixing member 19 on the second member 3 side.

In this embodiment, the wire body 6 is supported by the first fixing member 19 and the second fixing member 20 in the internal space of the second member 3. In addition, a tension alleviating portion 18 is configured by loosening a portion of the wire body 6 located between the first fixing member 19 and the second fixing member 20. In other words, because the second member 3 rotates in accordance with the rotation of the output shaft member 11 of the reduction gear 9, the wire body 6 between the first fixing member 19 and the second fixing member 20 does not involve a large deformation due to the operation of the rotary shaft structure 1. However, when the strain-generating bodies 17 are elastically deformed as a result of torque acting on the torque sensor 5, slight relative rotation is generated between the first sensor constituent member 15 and the second sensor constituent member 16.

Because of this, if the wire body 6 between the first fixing member 19 and the second fixing member 20 is fixed without loosening in a state in which torque is not applied, there is a possibility that a tensile force acting on the wire body 6 is generated by means of the relative rotation between the first sensor constituent member 15 and the second sensor constituent member 16 of the torque sensor 5 when torque is applied. In this embodiment, there is an advantage in that it is possible to prevent deterioration in the detection precision of the torque sensor 5, which is caused by the tensile force of the wire body 6 acting on the torque sensor 5, by providing the tension alleviating portion 18 by loosening the wire body 6.

In this embodiment, the base and the revolving drum have been illustrated as examples of the first member 2 and the second member 3, respectively. Alternatively, the above-mentioned rotary shaft structure may be employed in at least one of a portion between the revolving drum and a first arm, a portion between the first arm and a second arm, and a rotary shaft constituting a wrist unit. In this embodiment, the third fixing member 21 may be fixed to the first member 2 instead of the input shaft member 10 of the reduction gear 9.

Although the six-axis articulated robot has been illustrated as an example in this embodiment, the type of the robot is not limited thereto, and the invention may be applied to any other type of robot. Although the torque sensor 5 for detecting torque has been illustrated as an example of the sensor in this embodiment, alternatively, a force sensor for detecting force (physical quantity) may be employed.

Figure 4:
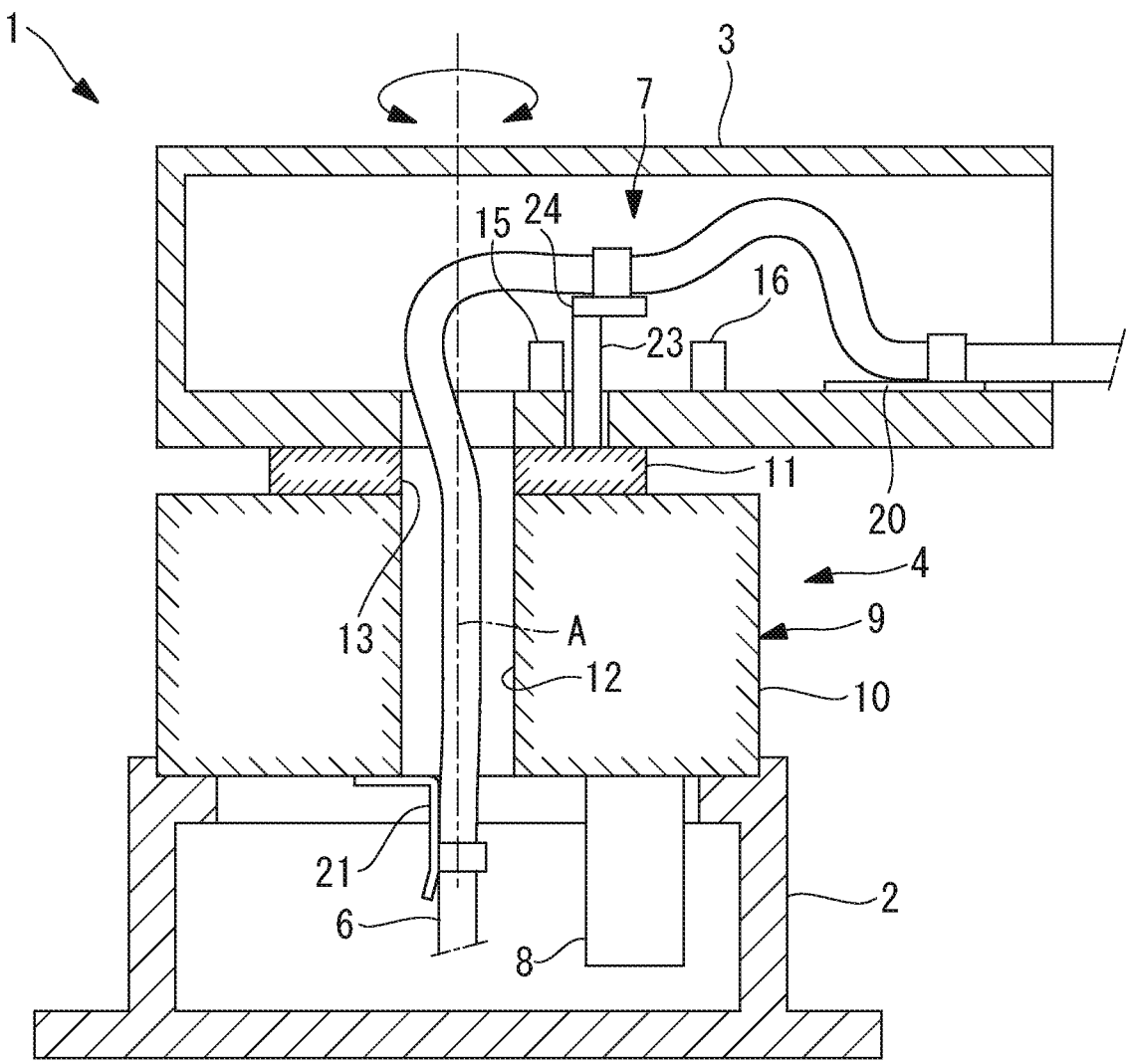
FIG. 4 is a longitudinal sectional view partially showing a modification of the robot including the rotary shaft structure in FIG. 1.
Figure 5:
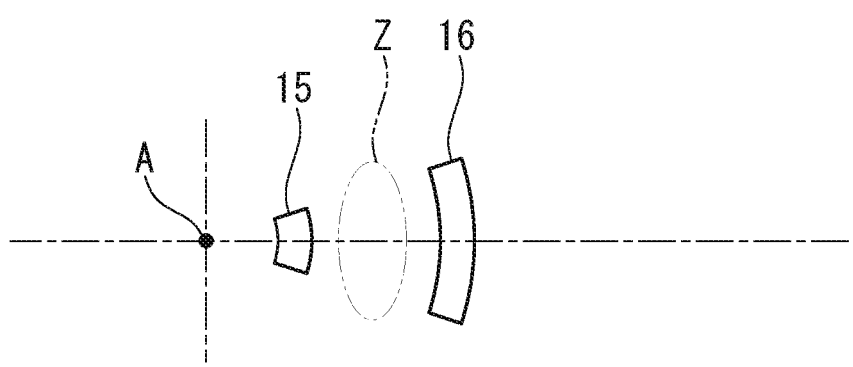
FIG. 5 is a schematic diagram showing a position where the torsional amount is produced, said torsional amount being detected by a first sensor constituent member and a second sensor constituent member in the robot in FIG. 4.

Also, the torque sensor 5 is not limited to the integrated type in which the first sensor constituent member 15 and the second sensor constituent member 16 are connected to each other. As shown in FIGS. 4 and 5, it is permissible to employ, as the torque sensor 5, an encoder type wherein: the first sensor constituent member 15 and the second sensor constituent member 16 are connected to each other in the second member 3; the second member 3 is directly connected to the output shaft member 11; and torque is calculated from the relative rotational phase difference between the first sensor constituent member 15 and the second sensor constituent member 16 that are installed on the second member 3. A region Z in FIG. 5 indicates a position where the rotational phase difference (torsional amount) is produced, said rotational phase difference being detected by the first sensor constituent member 15 and the second sensor constituent member 16.

In this embodiment, the first fixing member 19 that is directly fixed to the output shaft member 11 of the reduction gear 9 is disposed so as to penetrate through the through-holes 22 between the strain-generating bodies 17 of the torque sensor 5. Alternatively, the first fixing member 19 may be disposed on the second member 3 side so as to penetrate through the central hole 14 of the torque sensor 5. In this case also, the first fixing member 19 may be disposed so as to have a gap between the first fixing member 19 and the first sensor constituent member 15 of the torque sensor 5. In other words, it suffices that the configuration in which the first fixing member 19 is not in direct contact with the torque sensor 5 be employed.

Although the tension alleviating portion 18 is configured by loosening the wire body 6 between the first fixing member and the second fixing member 20 in this embodiment, a tension alleviating portion having another configuration may be employed. For example, a slide mechanism 25 may be used as a tension alleviating portion and the second fixing member 20 may be slidably attached to the second member 3, whereby the tensile force acting on the wire body 6 is alleviated by sliding of the second fixing member 20.

The invention claimed is:

1. A rotary shaft structure comprising:
a first member;
a second member that is supported so as to be rotatable about a rotation axis with respect to the first member;
an actuator that includes an output shaft member connected to the second member, and that rotationally drives the second member about the rotation axis with respect to the first member;
a sensor that detects a physical quantity acting between the output shaft member and the second member; and
a first fixing member whose one end is fixed to the output shaft member,
wherein a wire body is routed from the first member to the second member,
a second end of the first fixing member directly or indirectly fixes the wire body, the first fixing member extends toward the second member with a prescribed gap between the first fixing member and the sensor, and the wire body routed from the first member is fixed to the first fixing member on the second member.

2. The rotary shaft structure according to claim 1, wherein the actuator includes a central hole that is provided around the rotation axis that penetrates along the rotation axis, through which the wire body is made to penetrate.

3. The rotary shaft structure according to claim 2, wherein the first fixing member penetrates through an interior of a central hole of the sensor.

4. The rotary shaft structure according to claim 1, wherein the sensor includes through-holes that penetrate parallel to the rotation axis and the first fixing member penetrates through the through-holes.

5. The rotary shaft structure according to claim 1, further comprising:
a second fixing member that is fixed to the second member, wherein the wire body is fixed to the first fixing member and the second fixing member on the second member.

6. The rotary shaft structure according to claim 5, further comprising:
a tension alleviating portion that prevents a prescribed magnitude or more of a tensile force from acting on the wire body disposed between the first fixing member and the second fixing member.

7. The rotary shaft structure according to claim 6, wherein the tension alleviating portion is configured by loosening the wire body.

8. The rotary shaft structure according to claim 3, wherein the first fixing member includes a plurality of shaft members that penetrate through the through-holes, and a connecting member that connects distal ends of the plurality of shaft members to each other.

9. The rotary shaft structure according to claim 1, further comprising:
a third fixing member that fixes the wire body on the first member.

10. A robot, comprising at least one rotary shaft structure, the at least one rotary shaft structure comprising:
   a first member;
   a second member that is supported so as to be rotatable about a rotation axis with respect to the first member;
   an actuator that includes an output shaft member connected to the second member, and that rotationally drives the second member about the rotation axis with respect to the first member;
   a sensor that detects a physical quantity acting between the output shaft member and the second member; and
   a first fixing member whose one end is fixed to the output shaft member, wherein a wire body is routed from the first member to the second member, a second end of the first fixing member directly or indirectly fixes the wire body, the first fixing member extends toward the second member with a prescribed gap between the first fixing member and the sensor, and the wire body routed from the first member is fixed to the first fixing member on the second member.

* * * * *